United States Patent
Gaiduk et al.

(10) Patent No.: US 11,226,478 B2
(45) Date of Patent: Jan. 18, 2022

(54) MICROSCOPE AND METHOD FOR VIEWING A SPECIMEN USING A MICROSCOPE

(71) Applicant: CARL ZEISS MICROSCOPY GMBH, Jena (DE)

(72) Inventors: Alexander Gaiduk, Jena (DE); Dominik Stehr, Jena (DE); Johannes Winterot, Jena (DE); Volker Pusch, Hüttlingen (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 0 days.

(21) Appl. No.: 16/480,035

(22) PCT Filed: Jan. 12, 2018

(86) PCT No.: PCT/EP2018/050730
§ 371 (c)(1),
(2) Date: Jul. 23, 2019

(87) PCT Pub. No.: WO2018/134129
PCT Pub. Date: Jul. 26, 2018

(65) Prior Publication Data
US 2019/0384051 A1  Dec. 19, 2019

(30) Foreign Application Priority Data
Jan. 23, 2017  (DE) .................. 10 2017 101 188.9

(51) Int. Cl.
*G02B 21/36* (2006.01)
*G02B 21/00* (2006.01)
*G06K 9/00* (2006.01)

(52) U.S. Cl.
CPC ......... *G02B 21/367* (2013.01); *G02B 21/002* (2013.01); *G02B 21/008* (2013.01);
(Continued)

(58) Field of Classification Search
CPC ................ G02B 21/008; G02B 21/002; G02B 21/0365; G02B 21/00; G01N 21/00
See application file for complete search history.

(56) References Cited

U.S. PATENT DOCUMENTS 7,269,344 B2  9/2007  Nishioka et al.
7,345,816 B2  3/2008  Ri
(Continued)

FOREIGN PATENT DOCUMENTS

DE     19733193 A1    2/1999
DE   102006042157 A1  3/2008
(Continued)

*Primary Examiner* — Kyle M Lotfi
(74) *Attorney, Agent, or Firm* — Stuart H. Mayer; Mayer & Williams PC (57) ABSTRACT

The present invention relates to a method for viewing a specimen using a microscope which comprises an objective lens and an image sensor for converting an image formed on the image sensor by the objective lens. A field of view of the microscope can be varied by selecting a section of the image sensor. In one step of the method, an initial image of at least a partial section of the specimen is captured with the microscope, for which a first field of view is selected on the microscope. The initial image is analyzed to determine at least two differing fields of view forming a partial area image, wherein a partial area of the initial image is formed by each of the fields of view forming a partial area image. Images of the partial areas of the specimen are captured for each of the determined fields of view forming a partial area image. The invention further relates to a microscope for viewing a specimen using a microscope.

19 Claims, 3 Drawing Sheets

(52) U.S. Cl.
CPC ....... *G02B 21/0048* (2013.01); *G02B 21/361* (2013.01); *G02B 21/365* (2013.01); *G06K 9/0014* (2013.01)

(56) References Cited

U.S. PATENT DOCUMENTS

| | | | |
|---|---|---|---|
| 8,908,993 B2* | 12/2014 | Suzuki | G02B 21/367 |
| | | | 382/278 |
| 9,588,329 B2* | 3/2017 | Sieckmann | G06K 9/00134 |
| 2006/0140462 A1 | 6/2006 | Saggau | |
| 2007/0031043 A1 | 2/2007 | Perz | |
| 2007/0279733 A1* | 12/2007 | Sander | G02B 21/22 |
| | | | 359/384 |
| 2011/0109736 A1* | 5/2011 | Mertz | G06T 5/008 |
| | | | 348/79 |
| 2013/0070076 A1* | 3/2013 | Kuster | G02B 21/025 |
| | | | 348/79 |
| 2013/0107275 A1* | 5/2013 | Boccara | G01B 11/2441 |
| | | | 356/479 |
| 2019/0251706 A1* | 8/2019 | Difato | G06T 5/50 |

FOREIGN PATENT DOCUMENTS

| | | |
|---|---|---|
| DE | 69838297 T2 | 5/2008 |
| DE | 102007033793 A1 | 1/2009 |
| DE | 102013208415 A1 | 11/2014 |
| EP | 1918751 A1 | 5/2008 |
| WO | 2017/215707 A2 | 12/2017 |

* cited by examiner

MICROSCOPE AND METHOD FOR VIEWING A SPECIMEN USING A MICROSCOPE

BACKGROUND OF THE INVENTION

The present invention initially relates to a method for examining a sample by microscopy using a microscope comprising an objective and an image sensor for converting an image that is imaged directly or indirectly by the objective onto the image sensor. Furthermore, the invention relates to a microscope for examining a sample by microscopy.

DE 197 33 193 A1 discloses a microscope with adaptive optics. In this microscope, a transmitting wavefront modulator is arranged between an objective and a tube lens. The microscope can be used for confocal microscopy, for laser-assisted microscopy, for conventional microscopy or for analytical microscopy.

U.S. Pat. No. 7,345,816 B2 has disclosed an optical microscope which comprises a mirror with a controllably changeable reflecting surface. By changing the surface of the mirror, it is possible to record images from different focal positions.

U.S. Pat. No. 7,269,344 B2 discloses an optical apparatus comprising an imaging optical system which comprises deformable mirrors and a digital zoom function. As a result of this, the electronic magnification should be changeable with high image sharpness.

The "3D Microscope" product, produced by SD Optics, serves for the quick production of macroscopic and microscopic images which have an extended depth of field (EDoF—extended depth of field). A mirror array lens system, referred to as a MALS module, serves to implement the EDoF functionality. MALS denotes a mirror array lens system. Details of this system are disclosed, for example, in WO 2005/119331 A1 or WO 2007/134264 A2. The product comprises, inter alia, an LED ring illumination, a coaxial illumination, a sub-stage illumination, a translation stage, objectives with 5×, 10×, 20× and 50× magnification and fast automatic focusing. The focusing can be modified with a frequency of up to 10 kHz.

DE 698 38 297 T2 discloses a method for capturing and reproducing magnified sample images by way of a computer-controlled microscope. Object stage movements and image dimensions are controlled when recording a first set of digitized images of a sample in such a way that a first set of contiguous image slices are produced in order to facilitate a magnified overall view of the sample. The overall view of the sample is displayed so that a user can interactively select a region of interest to them. Accordingly, the region is scanned at a higher optical resolution and a second set of digitized images is produced.

US 2006/0140462 A1 has disclosed a method for confocal recording, in which there is a locally targeted readout of CMOS image sensors in regions of interest.

EP 1 918 751 A2 teaches a microscope which should facilitate the recording of three-dimensional images and highly resolved images with different focal positions.

DE 10 2013 208 415 A1 discloses a method for localization microscopy with a high three-dimensional resolution, which intends to image a sample in the depth direction and transversely thereto with high resolution. Fluorescence emitters in the sample are repeatedly excited to emit fluorescence radiation. Two detectors are used to record an individual image in the form of simultaneous individual image pairs of the same fluorescence state of the sample from two different focal planes, which are spaced apart by a distance in the depth direction.

SUMMARY OF THE INVENTION

The object of the present invention consists of being able to undertake an examination of a sample by microscopy in a flexible and quick manner when proceeding from the prior art.

The specified object is achieved by a method in accordance with attached claim 1 and by a microscope in accordance with attached independent claim 13.

The method according to the invention serves to examine a sample by microscopy using a microscope, in particular a digital microscope. In the digital microscope there preferably is an electronic image conversion, wherein the recorded image is processed further in the form of digital data and displayed on an electronic image reproducing device. The microscope comprises an objective and an image sensor for converting an image that is imaged directly or indirectly by the objective onto the image sensor.

An image-sensor-side field of view of the microscope is variable by selecting a section of the image sensor. Consequently, a specific section of the image sensor is selected and read in order to obtain a specific field of view of the microscope. Only a small section is required for a small field of view. The section comprises the entire image sensor for a maximum field of view. The section is defined by those pixels of the image sensor which are situated within the section, wherein some or all pixels may be grouped. Thus, the section is defined by a location and an area. The field of view is characterized, in particular, by an image-sensor-side aperture angle of the microscope. The field of view of the microscope is changeable, and so the image-sensor-side aperture angle is changeable, i.e. adjustable. The objective, per se, may have a fixed field of view.

The image-sensor-side field of view is defined by an at least two-dimensional extent, with it also being possible for a three-dimensional extent to be defined, and so it is not only the field of view that is variable on the microscope, but also a viewing frustum.

In one step of the method according to the invention, an initial image of at least a portion of the sample is recorded by the microscope. The image comprises at least the aforementioned portion, a main region of the sample or the entire sample. A first image-sensor-side field of view is selected on the microscope for the purposes of recording the initial image. That is to say, a first section of the image sensor is selected and read. The first field of view may also be provided within a first viewing frustum, the latter being selected. The initial image may be two-dimensional or three-dimensional.

Three-dimensional images comprise information about the object to be presented for each point in space. By way of example, in the case of an orthogonal coordinate system with an X-axis, a Y-axis and a Z-axis, intensity values and/or colour values may be specified for each point in space.

There are also images in which, for example, only one Z-value is known for each pair of X- and Y-coordinates. By way of example, this is the case if only the form of the surface of a three-dimensional body is known. It is also possible to select intensity values as "third dimension" for the X- and Y-coordinates of a point. These and further cases which facilitate the representation of images with a three-dimensional illusion are also referred to as pseudo-three-dimensional or 2.5-dimensional images or representations.

Images which facilitate a three-dimensional representation or which facilitate the representation of images with a three-dimensional illusion are, together, referred to as three-dimensional images hereinbelow.

In a further step of the method according to the invention, the initial image is analysed in order to ascertain at least two different portion-imaging image-sensor-side fields of view for recording microscopic images of at least a plurality of portions of the sample. The analysis may be carried out manually or automatically. The portion-imaging fields of view are ascertained by the analysis, and so a plurality of sections of the image sensor which are suitable for recording the microscopic images of the plurality of portions of the sample are ascertained. A portion of the initial image is imaged by each of the portion-imaging fields of view. Preferably, respectively one portion-imaging field of view is determined for each of the portions such that each of the portions can be efficiently examined by microscopy with an individually suitable portion-imaging field of view. In terms of their position in relation to the image sensor, the portion-imaging fields of view differ in an x-direction and/or y-direction. The portion-imaging fields of view preferably also differ in terms of their size and/or resolution. The portion-imaging fields of view may also be provided in each case within portion-imaging viewing frusta, the latter being selected. Accordingly, the associated microscopic images can be not only two-dimensional, but can also be three-dimensional. The portion-imaging fields of view or viewing frusta preferably also differ in terms of their position in the z-direction, which is perpendicular to the x-direction and y-direction. The portion-imaging fields of view or viewing frusta preferably also differ in terms of their size in the z-direction and/or resolution in the z-direction.

In a further step of the method according to the invention, the microscopic images of the plurality of portions of the sample are recorded using the microscope, for the purposes of which the previously determined portion-imaging field of view is selected on the microscope in each case, i.e. in that the respectively previously determined section of the image sensor is selected and read.

A particular advantage of the method according to the invention consists of being able to examine the portions by microscopy in an adapted manner by determining the portion-imaging fields of view such that the examination of the entire sample by microscopy can be carried out quickly, without having to accept impairments of the quality of the microscopic images. In particular, the portions of the sample can be examined by microscopy with adapted portion-imaging fields of view and resolutions, depending on the richness of detail in the individual portions. To the extent that the portions are recorded in three dimensions, the resolution in the third dimension is preferably also adapted in each case in the portion-imaging fields of view.

The method according to the invention can be used for quickly recording two-dimensional and/or three-dimensional microscopic images of large samples. Hence, the method is preferably used for in-line examination in the electronics industry, in particle analysis, of non-metallic inclusions, in additive manufacturing, in the pharmaceutical industry and when producing medical appliances.

The initial image and the images of the portions are preferably recorded by exactly one objective such that there is no need to change the objective when carrying out the method according to the invention. Alternatively, the initial image can be recorded with a different objective or with a different optical image recording device of the microscope. By way of example, the image recording device can be formed by an overview camera or by a camera for two-dimensional or three-dimensional images.

In a first preferred embodiment of the method according to the invention, the initial image is recorded as an overview image of the sample. The overview image preferably shows at least a main region of the sample, which preferably comprises at least half of the sample. Particularly preferably, the overview image shows the entire sample. For the purposes of recording the overview image, the first field of view is selected as an overview-imaging field of view, which is larger than all portion-imaging fields of view. The overview-imaging field of view has a large sample-side aperture angle. The microscopic images of the portions are recorded with a finer resolution than the initial overview image, should this be necessary. The finer resolution may be formed in the x-direction, y-direction and/or z-direction. Not all pixels of the image sensor in the selected section are read when recording the overview image with the coarser resolution; instead, only e.g. each third pixel is read, or the pixels are grouped. Also, it is possible e.g. to reduce the resolution in the z-direction by having larger steps in the z-direction, and so the overview image is recorded more quickly. Alternatively, the initial image can be recorded with a different optical image recording device, such as e.g. an overview camera.

In the first preferred embodiment of the method according to the invention, the individual portions imaged in the initial overview image are preferably analysed when analysing the initial overview image in order to determine, in each case, a resolution in at least two dimensions or in three dimensions that is necessary for examining the respective portion by microscopy. To this end, the portions imaged in the overview image are preferably analysed in relation to the richness of their detail. The more detailed the respective portion, the higher the necessary resolution for recording the microscopic image of this portion. The individual portion-imaging fields of view are selected in accordance with the respective required resolution determined previously. The lower the necessary resolution, the greater the respective portion-imaging field of view or viewing frustum may be selected in order to efficiently record the respective image, for the purposes of which, in particular, not all pixels of the image sensor in the selected section are read or a plurality of pixels in the selected section are respectively read in combination or there is sub-sampling of the pixels in the selected section.

In the first preferred embodiment of the method, the latter is preferably carried out recursively. To this end, at least one of the microscopic images of the portions is analysed in order to determine at least one sub-portion-imaging field of view for recording microscopic images of at least a plurality of sub-portions of the sample. The sub-portion-imaging fields of view are preferably smaller than the respective portion-imaging field of view. Microscopic images of the plurality of sub-portions of the sample are recorded with the microscope, for the purposes of which the previously determined sub-portion-imaging field of view is selected in each case on the microscope. The microscopic images of the sub-portions are recorded with a finer resolution in one or more dimensions than the respective portion. There preferably is a recursive continuation for sub-sub-portions, etc.

In a second preferred embodiment, the initial image is recorded as a microscopic image of a first of the portions of the sample. To this end, the first field of view is selected as a portion-imaging field of view. The portion-imaging fields of view for recording the microscopic images of the further portions of the sample are therefore selected proceeding from the analysis of the image of the first portion of the sample. In a complementary manner, there may in each case be an analysis of the individual microscopic images of the further portions in order to select the individual portion-imaging fields of view for recording the microscopic images of the respectively following further portions of the sample. It is possible to record microscopic images for all portions of the sample or microscopic images may be recorded only for some of the portions of the sample.

Further preferred features for the first and second preferred embodiments, described above, are specified below.

The initial image and/or at least a plurality of the images of the portions are preferably recorded with an extended depth of field. The respective image with the extended depth of field may be two-dimensional or three-dimensional. A plurality of individual images with different z-positions are preferably recorded for the purposes of recording the initial image or the microscopic image with the extended depth of field. The individual images are subsequently superposed to form the initial image or to form the microscopic image.

The initial image and/or at least a plurality of the microscopic images are preferably additionally recorded with a depth information item such that these are preferably three-dimensional images.

Preferably, an actuator is set at an active optical element of the microscope for the purposes of recording the initial image or the microscopic images with an extended depth of field or additionally with a depth information item. By way of example, the mechanical actuator can be embodied to deform or displace the active optical element, which may be formed by a flexible lens, a lens that is controllable by mechanical vibrations, a liquid lens or a diffractive lens for measuring a depth information item of the sample. Preferably, the actuator is formed by a microsystem for mechanically moving micromirrors and/or micro-lenses. The actuator is preferably a focus actuator and/or an aberration actuator. The actuator is preferably operated at a frequency of at least 1 kHz and more preferably operated at a frequency of at least 10 kHz.

In an advantageous embodiment, the optical actuator is embodied as a microsystem with mechanically movable micromirrors for recording an extended depth of field. In this embodiment, use can be made, for example, of the above-described "MALS module" by SD Optics Inc. as an optical actuator. By way of example, a MALS module may be embodied as a Fresnel lens, as described, for example, in WO 2005/119331 A1. This Fresnel lens is formed by a multiplicity of micromirrors. The focal length of the Fresnel lens can be changed very quickly by changing the orientation of the micromirror. This quick change in the focal length permits very quick setting of the focal plane to be imaged. This renders it possible to record a multiplicity of recordings in adjacent focal planes in a short period of time. Such a sequence of images which were recorded in different focal planes is also referred to as a focus stack. An image with an extended depth of field can be ascertained from a focus stack.

The microscopic images of the portions can also be referred to as tiles. The method according to the invention is therefore suitable for examining large samples, such as e.g. a printed circuit board, by microscopy. The recorded microscopic images of the portions are preferably assembled to make an overall image of the sample.

Preferably, a portion-imaging field of view is determined in each case for each of the portions and used for recording the corresponding image. Hence, an adapted portion-imaging field of view with an adapted resolution is determined and used for each of the portions.

Particularly preferably, further parameters of the microscope in addition to the field of view are adapted for recording the microscopic images of the portions of the sample. The further parameters of the microscope are determined as a result of the analysis of the initial image and selected when recording the microscopic images of the portions at the microscope. The further parameters of the microscope preferably comprise a two-dimensional or three-dimensional resolution of the respective microscopic image to be recorded, a viewing frustum for recording the respective three-dimensional microscopic image to be recorded, a contrast for recording the respective microscopic image to be recorded, parameters for controlling aberrations, the option of an extended depth of field, the option of a depth information item and/or parameters for setting the actuator of the active optical element. Accordingly, the initial image is analysed in order, furthermore, to determine a two-dimensional or three-dimensional resolution of the microscopic images to be recorded, determine a viewing frustum for recording the three-dimensional microscopic images, determine a contrast for recording the microscopic images, determine parameters for controlling aberrations, determine parameters for setting the actuator of the active optical element and/or in order to decide whether the microscopic images are respectively recorded with an extended depth of field and/or with a depth information item. Subsequently, the microscopic images of the plurality of portions are respectively recorded with the previously determined two-dimensional or three-dimensional resolution, with the previously determined viewing frustum, with the previously determined contrast, with the previously determined parameters for controlling aberrations, with the previously determined parameters for setting the actuator, with an extended depth of field and/or with a depth information item.

The portion-imaging fields of view preferably have a sample-side aperture angle of at most 140° in each case. The overview-imaging field of view preferably has a sample-side aperture angle of at least 1° and more preferably of at least 5°.

The portion-imaging fields of view have, in relation to the sample, an edge length or a diameter of preferably at most 5 mm, more preferably of at most 2 mm. The overview-imaging field of view has, in relation to the sample, an edge length or a diameter of preferably more than 5 mm.

The microscopic images of the portions are preferably recorded with a resolution of at least 500 line pairs/mm in each case. The microscopic images of the portions are preferably recorded with a resolution of at least 0.3 µm in relation to the sample in each case. The initial overview image is preferably recorded with a resolution of at most 400 line pairs/mm. The initial overview image is preferably recorded with a resolution of at most 2 µm in relation to the sample. The initial overview image is more preferably recorded with a resolution of at most 10 µm in relation to the sample.

The sample is preferably illuminated when the initial image is recorded and when the microscopic images are recorded, for the purposes of which use is preferably made of visible light, UV radiation and/or IR radiation.

The microscope according to the invention is preferably digital and initially comprises an objective for magnified optical imaging of a sample in an image plane. By means of the objective, an image is representable in the image plane with an optical resolution. The optical resolution is determined by the physical processes and the properties of the objective. The objective comprises optical components for magnified optical imaging of the sample in the image plane.

The optical components are formed, in particular, by optical lenses and, optionally, also by one or more mirrors, stops and filters.

The microscope furthermore comprises an image sensor for converting the image that is imaged directly or indirectly by the objective onto the image sensor into an electrical signal. An image-sensor-side field of view of the microscope is variable by selecting a section of the image sensor.

The microscope furthermore comprises an electronic control unit for controlling the image sensor. Preferably, the control unit furthermore serves to control an image processing unit that processes the image data of the image sensor. The control unit is configured to carry out the method according to the invention. The control unit is preferably configured to carry out preferred embodiments of the method according to the invention. Incidentally, the microscope preferably also has features which are specified in conjunction with the method according to the invention and the preferred embodiments thereof. The method according to the invention preferably also has features which are specified in conjunction with the microscope according to the invention and the preferred embodiments thereof.

Preferably, the objective has a maximum magnification factor of at most 40. To the extent that the objective has a fixed magnification factor, this also constitutes the maximum magnification factor. In preferred embodiments of the microscope, the maximum magnification factor is at most 30. In further preferred embodiments of the microscope, the maximum magnification factor is at most 20. In further preferred embodiments of the microscope, the maximum magnification factor is at most 10. In further preferred embodiments of the microscope, the maximum magnification factor is at most 5.

The objective has a numerical aperture which is preferably at least 0.01. The numerical aperture is further preferably at least 0.1.

The maximum image resolution of the image sensor is preferably defined by a pixel spacing. The pixel spacing is the distance between two immediately adjacent pixels. The pixel spacing is the quotient of the extent of the image sensor in one of its directions of extent to the number of pixels in this direction of extent. By way of example, the pixel spacing is the quotient of the width of the image sensor to the number of pixels in a line of the matrix. By way of example, the pixel spacing is the quotient of the height of the image sensor to the number of pixels in a column of the matrix.

In preferred embodiments of the microscope, the pixel spacing of the image sensor is at most 6 µm. In further preferred embodiments of the microscope, the pixel spacing of the image sensor is at most 4 µm. Particularly preferably, the pixel spacing of the image sensor is 2.0 µm, 1.8 µm, 1.6 µm, 1.4 µm, 1.2 µm, 1.0 µm, 0.8 µm or 0.6 µm.

The number of pixels in one column of the matrix-shaped image sensor is preferably at least 1000 while, at the same time, the number of pixels in a line of the matrix-shaped image sensor is likewise at least 1000.

In preferred embodiments of the microscope, there are at least 5 million pixels in the image sensor. In further preferred embodiments of the microscope, there are at least 8 million pixels in the image sensor. In further preferred embodiments of the microscope, there are at least 20 million pixels in the image sensor. In further preferred embodiments of the microscope, there are at least 50 million pixels in the image sensor. In further preferred embodiments of the microscope, there are at least 100 million pixels in the image sensor.

The microscope according to the invention preferably comprises an actuator of an active optical element, by means of which, in particular, the focusing is adjustable. Preferably, the actuator of the active optical element is formed by a microsystem for mechanically moving micromirrors and/or micro-lenses. The control unit is preferably also embodied to control the actuator.

DESCRIPTION OF THE DRAWINGS

Further details and developments of the invention will become apparent from the following description of preferred embodiments of the invention, with reference being made to the drawing. In the drawing.

DETAILED DESCRIPTION OF THE INVENTION

Figure 1:
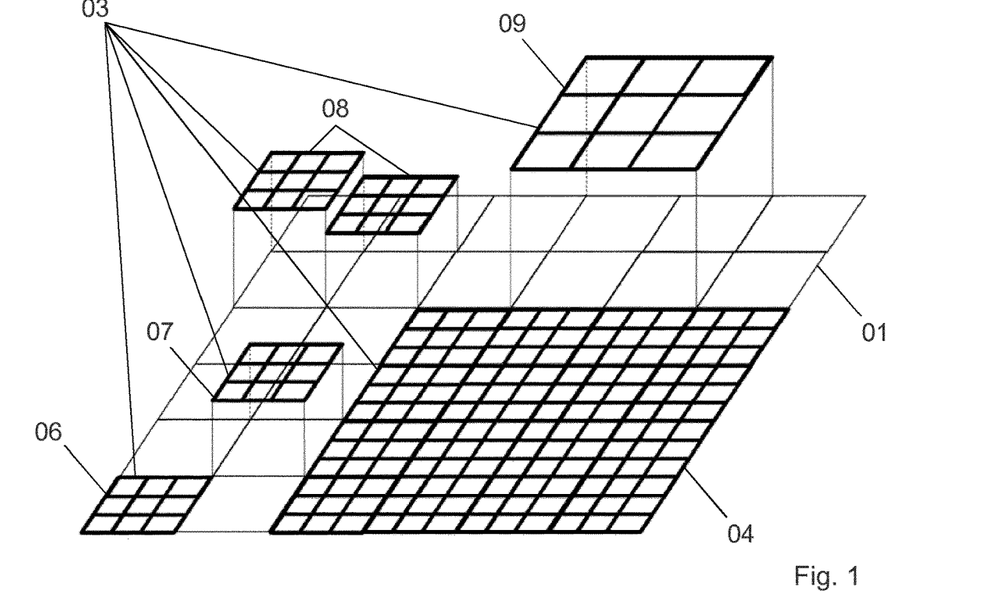
FIG. 1 shows the recording of an overview image and microscopic images of portions in accordance with a preferred embodiment of the method according to the invention.

FIG. 1 elucidates the recording of an overview image 01 of a sample 02 (shown in FIG. 2) and a plurality of microscopic images 03 of portions of the sample 02 in accordance with a preferred embodiment of the method according to the invention.

The overview image 01 has a low resolution of 250 line pairs/mm and was recorded with a large field of view which, in relation to the sample 02, equals 3.6 mm 0.3.6 mm. The resolution in the z-direction is 100 µm. Since the overview image 01 images the entire sample 02 (shown in FIG. 2), the recording thereof required a relatively long period of time, and so it was recorded with a low speed of 10 images/s. Since the overview image 01 in the shown embodiment does not have any depth information, it can be characterized as two-dimensional.

Figure 2:
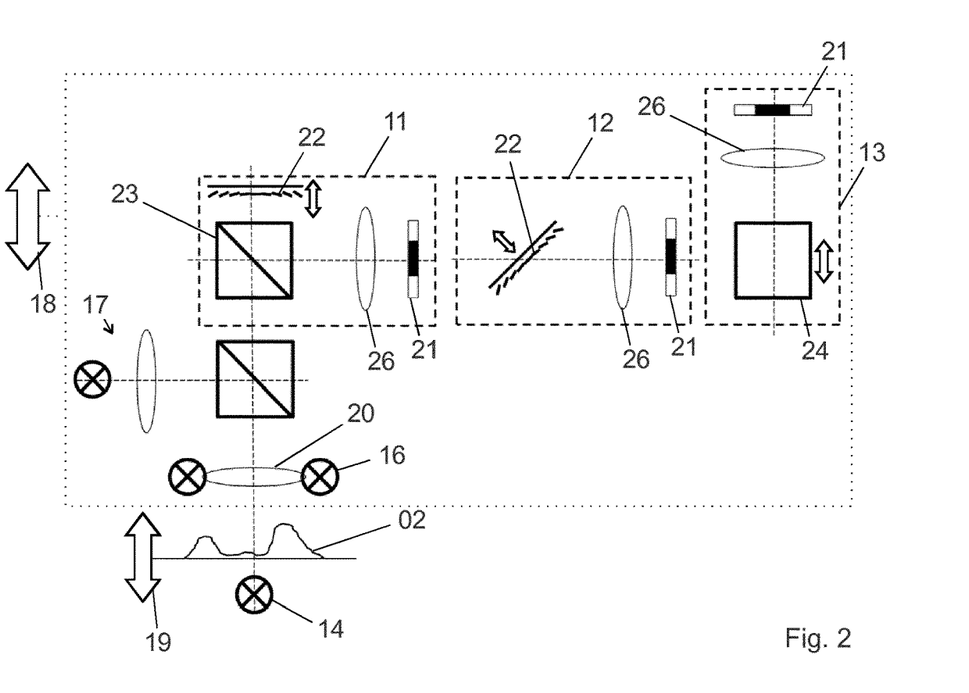
FIG. 2 shows a first preferred embodiment of a digital microscope according to the invention with three options for measuring a depth information item.

A first microscopic image 04 of the plurality of microscopic images 03 images a large portion of the sample 02 (shown in FIG. 2). This portion of the sample 02 is already imaged in the overview image 01. Since the portion is large, the first microscopic image 04 was recorded with a large field of view which, in relation to the sample 02, equals 2.4 mm 0.2.4 mm. The first microscopic image 04 was recorded with a high resolution of 1000 line pairs per mm, and so small details are reproduced. The resolution in the z-direction is 4.5 µm. Since the portion is large, recording the first microscopic image 04 required a relatively long period of time, and so it was recorded with a low speed of 10 images/s. Since the first microscopic image 04 in the shown embodiment does not have any depth information, it can be characterized as two-dimensional.

A second microscopic image 06 of the plurality of microscopic images 03 images a small portion of the sample 02 (shown in FIG. 2). This portion of the sample 02 is already imaged in the overview image 01. Since the portion is small, the second microscopic image 06 was recorded with a small field of view which, in relation to the sample 02, equals 0.6 mm 0.0.6 mm. The second microscopic image 06 was recorded with a high resolution of 1000 line pairs per mm, and so small details are reproduced. The resolution in the z-direction is 4.5 µm. Since the portion is small, recording the second microscopic image 06 required a short period of time, and so it was recorded with a high speed of e.g. 30 images/s. Since the second microscopic image 06 in the shown embodiment does not have any depth information, it can be characterized as two-dimensional.

A third microscopic image 07 of the plurality of microscopic images 03 images a small portion of the sample 02 (shown in FIG. 2) in three dimensions. This portion of the sample 02 is already imaged in the overview image 01. Since the portion is small, the third microscopic image 07 was recorded with a small field of view and a small viewing frustum which, in relation to the sample 02, equals 0.6 mm 0.0.6 mm-0.45 mm. The third microscopic image 07 was recorded with a high resolution of 1000 line pairs per mm, and so small details are reproduced. The resolution in the z-direction is 4.5 µm. There was no magnification of the field of view in the z-direction. Since the portion is small, recording the third microscopic image 07 required a short period of time, and so it was recorded with a high speed of more than 1 volume/s. Since the third microscopic image 07 in the shown embodiment has a depth information item, it can be characterized as three-dimensional.

A fourth microscopic image 08 of the plurality of microscopic images 03 images two small portions of the sample (shown in FIG. 2) in three dimensions and in a mosaic-like manner. These portions of the sample 02 are already imaged in the overview image 01. The two small portions were recorded with relatively large fields of view which, in relation to the sample 02, equal 0.6 mm 0.6 mm 0.45 mm and 0.6 mm 0.6 mm 0.6 mm, respectively. The fourth microscopic image 08 was recorded with a high resolution of respectively 1000 line pairs per mm for both portions, and so small details are reproduced. The resolution in the z-direction is respectively 4.5 µm for the two small portions, with the resolution in the z-direction also being able to vary between the small portions. While there is no magnification of the field of view in the z-direction for the first small portion, a magnification of the field of view is undertaken in the z-direction for the second small portion. Since a plurality of portions are imaged, recording the fourth microscopic image 08 required a relatively long period of time, and so it is recorded with a low speed of respectively less than 1 volume/s for the two small portions. Since the fourth microscopic image 08 in the shown embodiment has a depth information item, it can be characterized as three-dimensional.

A fifth microscopic image 09 of the plurality of microscopic images 03 images a mid-sized portion of the sample (shown in FIG. 2) in three dimensions. This portion of the sample 02 is already imaged in the overview image 01. Since the portion is mid-sized, the fifth microscopic image 09 was recorded with a relatively large field of view which, in relation to the sample 02, equals 1.2 mm 0.1.2 mm 0.1 mm. The fifth microscopic image 09 is recorded with a low resolution of 500 line pairs per mm, and so this recording only requires a short period of time, leading to a high speed of the recording of more than 1 volume/s. The resolution in the z-direction is 45 µm. There is a magnification of the field of view in the z-direction. Since the fifth microscopic image 09 in the shown embodiment has a depth information item, it can be characterized as three-dimensional.

The various characteristics of the recordings of the overview image 01, of the first microscopic image 04, of the second microscopic image 06, of the third microscopic image 07, of the fourth microscopic image 08 and of the fifth microscopic image 09 are presented in a comparative manner in Table 1.

TABLE 1

| Image | 2D/3D | Description | Resolution | Speed | Field of view | Resolution in z | Magnification in z |
|---|---|---|---|---|---|---|---|
| Overview image 01 | 2D | Single, large region | 250 lp/mm | 10 images/s | 3.6 · 3.6 mm² | 100 µm | — |
| First microscopic image 04 | 2D | Single | 1000 lp/mm | 10 images/s | 2.4 · 2.4 mm² | 4.5 µm | — |
| Second microscopic image 06 | 2D | Single | 1000 lp/mm | 30 images/s | 0.6 · 0.6 mm² | 4.5 µm | — |
| Third microscopic image 07 | 3D | Single | 1000 lp/mm | >1 volume/s | 0.6 · 0.6 · 0.45 mm³ | 4.5 µm | No |
| Fourth microscopic image 08 | 3D | Composed mosaic | 1000 lp/mm | <1 volume/s | 0.6 · 0.6 · 0.45 mm³ | 4.5 µm | No |
| | | | 1000 lp/mm | <1 volume/s | 0.6 · 0.6 · 0.6 mm³ | 4.5 µm | Yes |
| Fifth microscopic image 09 | 3D | Single | 500 lp/mm | >1 volume/s | 1.2 · 1.2 · 1 mm³ | 45 µm | Yes |

For the purposes of recording the overview image 01 and the microscopic images 03 there is, according to the invention, a suitable selection of a small maximum magnification factor of at most 40, a large maximum field of view, a quick mechanical focusing, an image conversion with a small pixel spacing and a large number of pixels, a fast transfer of the data obtained by the image conversion and the portions to be examined by microscopy for the purposes of increasing the speed of the image conversion.

In accordance with a first example according to the invention, a small maximum magnification factor of at most 40 and a large numerical aperture are selected in order to obtain a large maximum field of view and a fine optical resolution so as, in particular, to record two-dimensional microscopic images 03.

In accordance with a second example according to the invention, a small maximum magnification factor of at most 40 and a large numerical aperture are selected in order to obtain a large maximum field of view and in order to minimize the necessary changes in the magnification as a consequence of the large and fast variation in the focusing if three-dimensional microscopic images 03 are to be recorded.

In accordance with a third example according to the invention, a small pixel spacing is selected for the image conversion, said pixel spacing being small enough to ensure that there is no undersampling at the selected numerical aperture and the selected magnification. A large number of pixels is used for the image conversion, and so the field of view is large. The fast image conversion that is obtainable according to the invention is synchronized with varying focusing. It is possible to obtain two-dimensional microscopic images 03 by an image conversion with 42 million pixels and 1080 lines with a frame rate of more than 60 Hz. It is possible to obtain three-dimensional microscopic images 03 by way of a focus variation of >10 kHz at a speed of 1 volume/s of a spatial portion with a size of 10 mm 0.10 mm 0.10 mm, with the spatial resolution in the x-direction, y-direction and z-direction being 5 µm, 5 µm and 170 µm, respectively. For a spatial portion with a size of 6 mm 0.5 mm 0.7 mm, the spatial resolution in the x-direction, y-direction and z-direction is 0.8 µm, 0.9 µm and 170 µm, respectively. For a spatial portion with a size of 180 µm 0.130 µm 0.36 µm, the spatial resolution in the x-direction, y-direction and z-direction is 0.1 µm, 0.1 µm and 0.9 µm, respectively.

FIG. 2 shows a first preferred embodiment of a digital microscope according to the invention with three alternatively employable options 11, 12, 13 for measuring a depth information item. Depending on the configuration of the microscope, one of the options 11, 12, 13 is introduced into the beam path. In the illustration in FIG. 2, option 11 has been introduced into the beam path. This option 11 can be replaced by one of the options 12 and 13. The sample 02 can be examined by microscopy using the digital microscope. The digital microscope comprises a sub-stage illumination 14, a ring illumination 16 and a coaxial illumination 17, which, alternatively or together, serve to illuminate the sample 02. The respective option 11; 12; 13 may be displaced by first coarse focusing 18. As an alternative thereto, or in a complementary manner, the sample 02 may be displaced by second coarse focusing 19. The digital microscope furthermore comprises an objective 20 and an image sensor 21, which is arranged differently in the three options 11, 12, 13.

The three options 11, 12, 13 differ, in particular, in the realization of the measurement of a depth information item of the sample 02.

In the first option 11, a microsystem 22 with movable micromirrors serves to measure a depth information item of the sample 02, with the microsystem 22 with the movable micromirrors being arranged in a back-reflecting manner by way of a beam splitter 23. Moreover, the microsystem 22 serves for fast fine focusing, including a correction of the aberration. In the second option 12, the microsystem 22 with the movable micromirrors is arranged in a reflecting manner at an angle of 45°. Here too, the microsystem 22 serves in addition for fast fine focusing, including a correction of the aberration. In the third option 13, an active optical element 24, such as e.g. a lens that is controllable by mechanical vibrations, a liquid lens or a diffractive lens, serves to measure a depth information item of the sample 02. Moreover, the active optical element 24 serves for fast fine focusing, including a correction of the aberration. Optionally, a lens 26 is arranged in front of the image sensor 21 in each case. Each of the three options 11, 12, 13 facilitates a three-dimensional and a two-dimensional microscopic recording of the sample 02. By way of the method according to the invention, described above, it is possible to increase the speed of the measurement by a factor of between 2 and 100.

Figure 3:
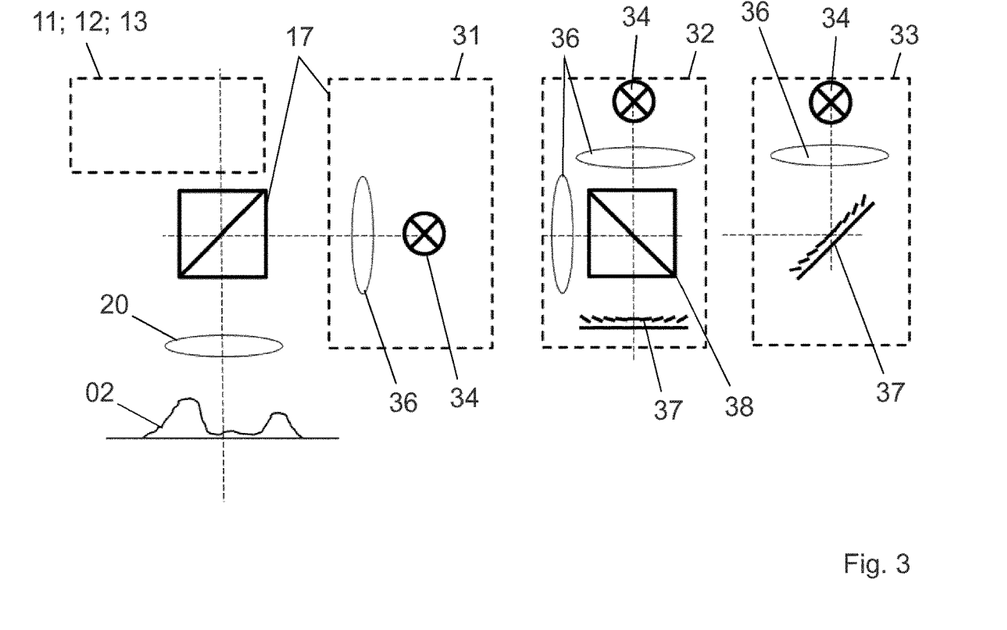
FIG. 3 shows a second preferred embodiment of the digital microscope according to the invention with three options for the illumination.

FIG. 3 shows a second preferred embodiment of the digital microscope according to the invention with three alternatively employable options 31, 32, 33 for the coaxial illumination 17 of the sample 02. In the illustration in FIG. 3, use is made of the first option 31 for the coaxial illumination 17. The further options 32, 33 for the coaxial illumination 17 can be introduced into the beam path of the microscope in place of the first option 31. The microscope once again comprises the objective 20 and one of the three options 11, 12, 13 that are schematically illustrated in FIG. 2 and explained above. One of the options 11, 12, 13 is introduced into the beam path in place of the square illustrated in FIG. 3 in such a way that the aforementioned, described function is obtained. The three options 31, 32, 33 for the coaxial illumination 17 each comprise a light source 34 and an optional lens 36 which, alternatively, may be e.g. a lens that is controllable by mechanical vibrations, a liquid lens or a diffractive lens. The light source 34 can be embodied to emit coherent, incoherent, continuous, pulsing or stroboscope-like light. In the second option 32 for the coaxial illumination 17, a microsystem 37 with mechanically movable micromirrors is arranged in a back-reflecting manner by way of a beam splitter 38. In the third option 33 for the coaxial illumination 17, the microsystem 37 with the movable micromirrors is arranged in a reflecting manner at an angle of 45°. The options 32; 33 facilitate an illumination with the option of controlling the focusing and the aberration. The aberration may be controlled in an illumination-path-specific and/or detection-path-specific manner. This control may be undertaken dynamically, depending on the time or on the z-position, or statically.

The options 31, 32, 33 may comprise further optical elements (not shown here), such as e.g. a lens that is controllable by mechanical vibrations, a liquid lens or a diffractive lens, as a result of which e.g. an intensity, a phase and/or a polarization of the light to be produced are controllable.

The three options 31, 32, 33 for the coaxial illumination 17 of the sample 02 may alternatively also be embodied for the sub-stage illumination or for the ring illumination.

Figure 4:
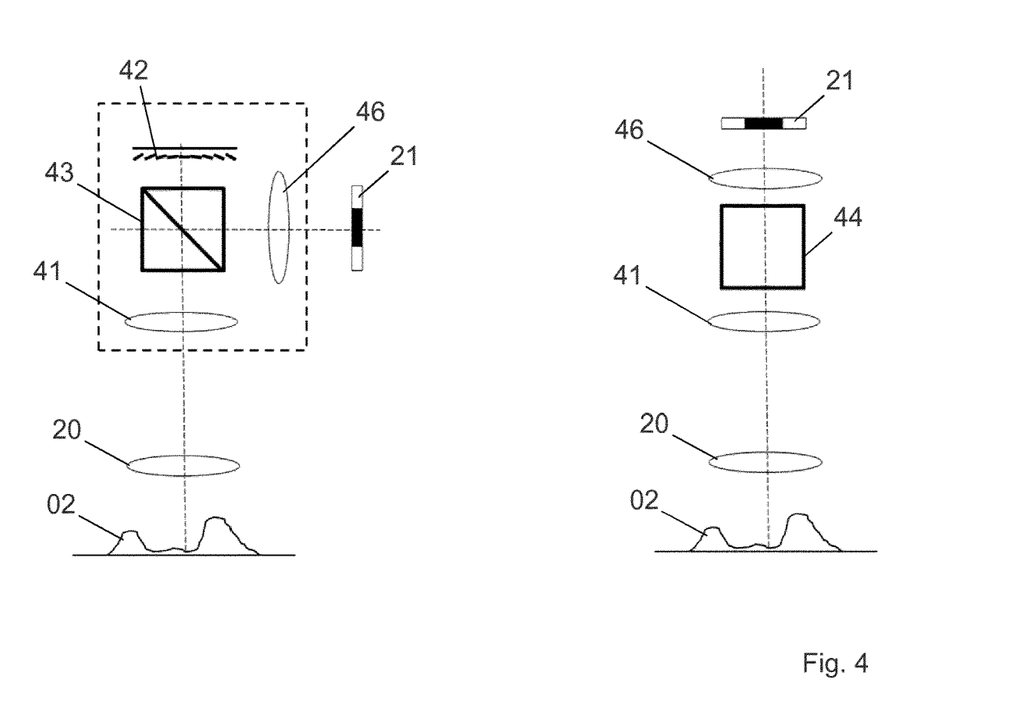
FIG. 4 shows a third and a fourth preferred embodiment of the digital microscope according to the invention.

FIG. 4 shows a third and a fourth preferred embodiment of the digital microscope according to the invention, which, once again, comprise the objective 20, the coaxial illumination 17 (shown in FIG. 2) and the image sensor 21, with the image sensor 21 being removable. Beam-forming and/or focusing elements 41 optionally serve to adapt a light beam diameter to a focused region.

In the third embodiment, which is illustrated on the left-hand side, a microsystem 42 with movable micromirrors is arranged in a back-reflecting manner by way of a beam splitter 43 in order to act as an actuator for adjusting the focusing. In the fourth embodiment, which is illustrated on the right-hand side, a focus actuator 44 serves to adjust the focusing. A further optional lens 46 may be arranged in front of the image sensor 21.

Figure 5:
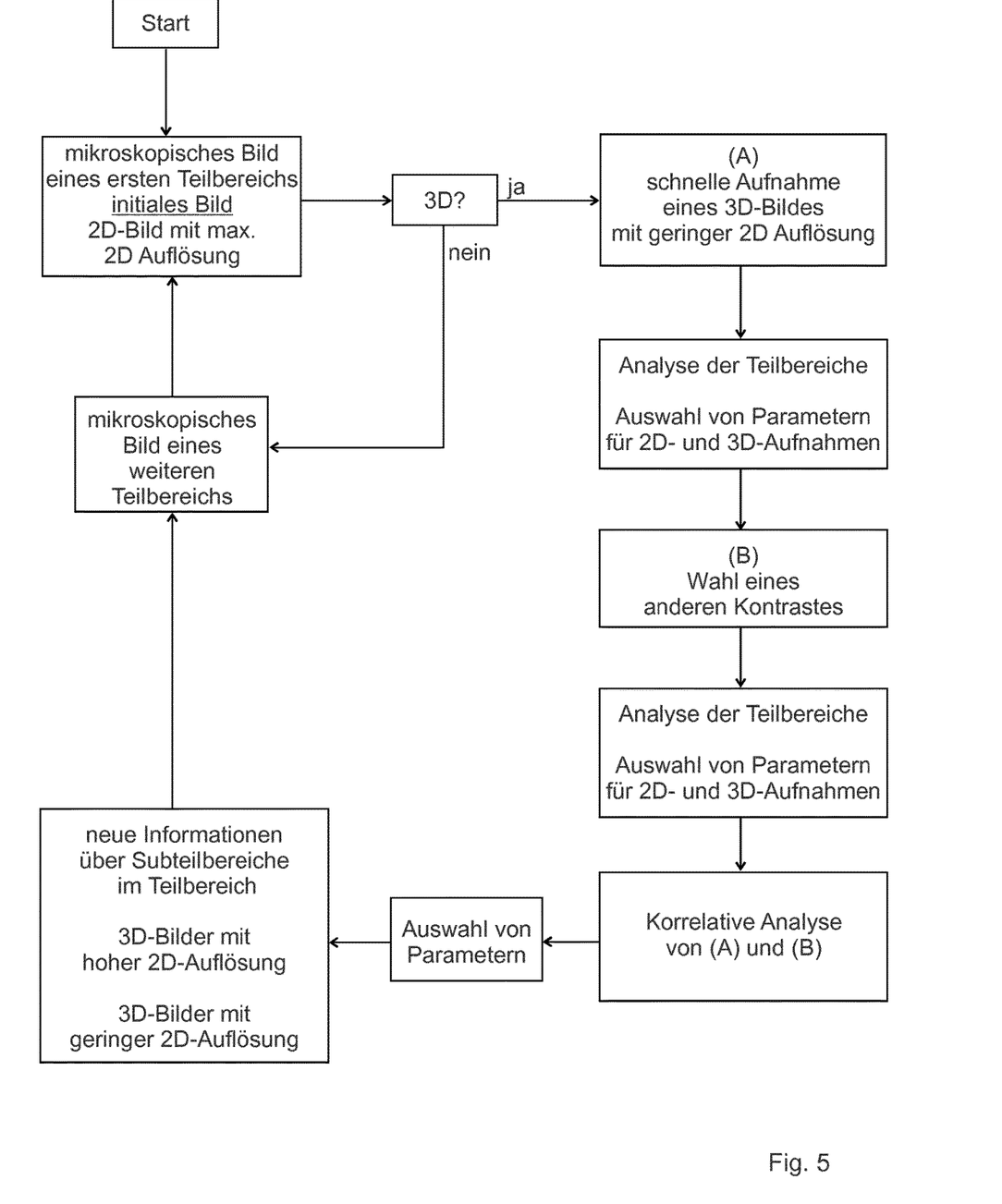
FIG. 5 shows a flowchart of a preferred embodiment of the method according to the invention.

FIG. 5 shows a flowchart of a preferred embodiment of the method according to the invention. In this embodiment, a microscopic image of a first portion of a sample is recorded at the outset. This is an initial image. In this embodiment, it is recorded as a two-dimensional image with a maximum two-dimensional resolution. If the sample is intended to be recorded in three dimensions, a three-dimensional image of the sample is subsequently recorded with a low two-dimensional resolution. Proceeding therefrom, further portions are analysed in order to determine parameters for two-dimensional and three-dimensional microscopic images of further portions. The parameters comprise the field of view/viewing frustum to be selected, but also e.g. contrast, parameters for setting an actuator of an active optical element 22, 24, 42; 44 (shown in FIGS. 2 and 4) and/or an option for recording an extended depth of field. The previously carried out recording is subsequently repeated with a different contrast. Proceeding therefrom, the further portions are analysed again in order to determine parameters for two-dimensional and three-dimensional microscopic images of further portions. These parameters are analysed with the previously ascertained parameters in respect of their correlation in order to finally select the parameters. In the next step, information about sub-portions in the respective portion is ascertained. Finally, a microscopic image of a further portion is recorded with the previously set parameters. If the sample should, in general, only be recorded in two dimensions, microscopic images of the further portions are recorded after recording the initial image, without recording and analysing three-dimensional images.

As an alternative to the presented embodiment, the initial image may also be a two-dimensional image with a low resolution and a large field of view, a three-dimensional image with a low resolution in three dimensions and a large viewing frustum.

The invention claimed is:

1. A method for examining a sample by microscopy using a microscope comprising an objective and an image sensor, wherein an image-sensor-side field of view of the microscope is modifiable by selecting a section of the image sensor; wherein the method comprises the following steps:
   recording an initial image of at least a portion of the sample with the microscope, for the purposes of which a first field of view is selected on the microscope, the initial image being recorded as a two-dimensional image with a maximum two-dimensional resolution or as a three dimensional image;
   ascertaining at least two differing portion-imaging fields of view by analyzing the initial image, wherein a portion of the initial image is imaged by each of the portion-imaging fields of view, and wherein by analyzing the initial image, a contrast for recording the microscopic
   images, parameters for controlling aberrations and/or parameters for setting an actuator of an optical element are ascertained and/or an option for recording an extended depth of field or an option for recording a depth information item is selected; and
   recording two-dimensional and/or three-dimensional images of the portions of the sample for each of the ascertained portion-imaging fields of view.

2. Method according to claim 1, wherein by analysing the initial image, a resolution of the microscopic images to be recorded and/or a viewing frustum for recording the microscopic images are ascertained.

3. The method according to claim 1, wherein the first field of view is larger than the at least one portion-imaging field of view, wherein the microscopic images of the portions are recorded with a finer resolution than the initial image.

4. The method according to claim 3, wherein the initial image is recorded as an overview image of the sample.

5. The method according to claim 3, wherein the individual portions that are imaged in the initial image are analysed when analyzing the initial image in order to determine a resolution that is required in each case for examining the respective portion by microscopy; and in that the individual portion-imaging fields of view are selected in accordance with the respective required resolution determined previously.

6. The method according to claim 3, wherein it comprises the following further steps:
   analysing at least one of the microscopic images of the portions in order to determine at least one sub-portion-imaging field of view for recording microscopic images of at least a plurality of sub-portions of the sample, wherein the at least one sub-portion-imaging field of view is smaller than the portion-imaging field of view; and
   recording microscopic images of the plurality of sub-portions of the sample for the respectively previously determined sub-portion-imaging field of view, wherein the microscopic images of the sub-portions are recorded with a finer resolution than the respective portion.

7. The method according to claim 1, wherein the initial image is recorded as a microscopic image of a first portion of the sample, for the purposes of which the first field of view is selected as the portion-imaging field of view.

8. The method according to claim 7, wherein the portion-imaging fields of view for recording the microscopic images of the further portions of the sample following the first portion are selected proceeding from the analysis of the image of the first portion of the sample, wherein the individual microscopic images of the further portions are respectively analysed in order to select the individual portion-imaging fields of view for recording the microscopic images of the further portions of the sample respectively following thereon.

9. The method according to claim 1, wherein the initial image and/or at least a plurality of the microscopic images are recorded with an extended depth of field.

10. The method according to claim 9, wherein a plurality of individual images with different z-positions are respectively recorded for the purposes of recording the initial image and/or the microscopic images with the extended depth of field.

11. The method according to claim 1, wherein use is made of an optical actuator for fast recording of a focus stack, said optical actuator being embodied as a microsystem with mechanically movable micromirrors.

12. The method according to claim 1, wherein the initial image and/or at least a plurality of the microscopic images are additionally recorded with a depth information item.

13. The method according to claim 1, wherein the actuator is configured to deform or displace the active optical element.

14. The method according to claim 1, wherein the actuator is formed by a microsystem for mechanically moving micromirrors and/or micro-lenses.

15. The method according to claim 1, wherein the actuator is a focus actuator and/or an aberration actuator.

16. A microscope for examining a sample by microscopy; comprising:
   an objective for magnified optical imaging of the sample;
   an image sensor for converting the imaged image into an electrical signal, wherein an image-sensor-side field of view of the microscope is variable by selecting a section of the image sensor; and
   an electronic control unit for controlling the image sensor, wherein the control unit is configured to carry out a method according to claim 1.

17. The microscope according to claim 16, characterized in that the objective has a maximum magnification factor of at most 40.

18. The microscope according to claim 17, wherein it comprises an optical actuator which is embodied as a microsystem with mechanically movable micromirrors for recording an extended depth of field.

19. The microscope according to claim 16, wherein it comprises an optical actuator which is embodied as a microsystem with mechanically movable micromirrors for recording an extended depth of field.

* * * * *